United States Patent [19]

Lawson et al.

[11] 3,957,723

[45] May 18, 1976

[54] FLAME AND SMOKE RETARDANTS FOR POLYVINYL CHLORIDE

[75] Inventors: David Francis Lawson; Edward Leo Kay, both of Akron, Ohio

[73] Assignee: The Firestone Tire & Rubber Company, Akron, Ohio

[22] Filed: June 27, 1975

[21] Appl. No.: 591,254

[52] U.S. Cl. .................. 260/45.75 W; 260/42.37; 260/42.46; 260/42.49; 260/45.7 R
[51] Int. Cl.² ............................................. C08J 3/20
[58] Field of Search ........... 260/42.37, 42.46, 42.49, 260/45.7 R, 45.75 W

[56] References Cited
UNITED STATES PATENTS

| | | | |
|---|---|---|---|
| 3,827,997 | 8/1974 | Bergomi | 260/42.49 |
| 3,865,760 | 2/1975 | Pitts et al. | 260/45.75 |
| 3,869,420 | 3/1975 | Mathis et al. | 260/42.49 |
| 3,878,166 | 4/1975 | Woycheshin et al. | 260/42.46 |

OTHER PUBLICATIONS

Fire and Flammability –Series–Vol. 71 pp. 251 to 275.

*Primary Examiner*—V.P. Hoke

[57] ABSTRACT

Aluminum oxide trihydrate and zinc oxide function synergistically in reducing the flammability of polyvinyl chloride and in reducing the maximum smoke intensity generated in the combustion of the aluminum oxide trihydrate, zinc oxide, polyvinyl chloride combination.

3 Claims, No Drawings

FLAME AND SMOKE RETARDANTS FOR POLYVINYL CHLORIDE

THE PRIOR ART

Aluminum oxide trihydrate (ALTH) which is $Al_2O_3 \cdot 3H_2O$, and zinc oxide (ZnO) are well known additives used in the plastics and rubber industries. ALTH is also very widely used as a fire retardant in various polymers and composites; however, the use of ZnO as a fire retardant is less well known.

F. J. Martin and K. R. Price in their article published in J. Appl. Polymer Sci. 12 143 (1968) postulated that the beneficial properties of ALTH as fire retardant were due to the endothermic dehydration of ALTH.

U.S. Pat. No. 2,472,112 of M. Leatherman teaches that ZnO functions as a dechlorinating agent in chlorinated coatings thus releasing flame-smothering gases.

Because of the rapid developments in flame retardant technology, a considerable amount of relatively generalized statements are made as to the efficiency of various flame retardant systems, however, it is becoming increasingly apparent to those skilled-in-the-art, that a particular flame retardant combination which is effective in one system may be completely ineffective in a different system and may indeed adversely affect other systems. The complexity of flame retardant technology has been recently reviewed by Samuel Steingiser in the Journal of Fire and Flammability Vol. 3, pages 238–253 July 1972. In this review, Steingiser considered the pros and cons of various test procedures and, although he pointed out the critical need for standardization of test procedures, he did indicate that the Limiting Oxygen Index (LOI) test, for flammability measurement, and the NBS (National Bureau of Standards) smoke chamber, as a smoke test, gave useful experimental data and were widely accepted. We have used both methods to check the beneficial and unexpected results resulting from the incorporation of ALTH and ZnO in polyvinyl chloride.

James J. Pitts states in The Journal of Fire and Flammability Vol. 3 pp. 51–84 January, 1972 that metal oxides such as calcium oxide (CaO) and ZnO were found to be detrimental when used as a partial replacement for antimony oxide ($Sb_2O_3$) in a system consisting of a flexibile urethane foam containing approximately 6.3 per cent chlorine, $Sb_2O_3$ and selected metal oxides (p. 71, Table 16). Pitts in this fine review article also discussed synergism of fire retardants.

"Flame Retardants: No Easy Answers", pages 42 to 47 of "Plastics Technology" for July 1974 contains a summary of the art on flame retardants and smoke inhibitors tested in plastics.

Quotation from page 42:

"Some sources say alumina trihydrate and zinc borate also reduce smoke when compared to antimony oxide".

Quotations from page 47:

"Zinc borates are also enjoying a popularity boom in PVC........."

".......a complex of antimony oxide (12.5%) and zinc oxide claimed to offer cost/performance advantages over antimony oxide and zinc borate".

"Last, but not least, alumina trihydrate (ATH) in plastics and foam rubber amounted to some 400 million pounds last year. ATH is also used in PVC seat covers, and wire insulation".

It should be noted that in the foregoing prior art, no specific suggestion is made to a combination of aluminum oxide trihydrate with zinc oxide as a fire retardant. The lack of specific suggestions is another indication of the complex nature of fire retardant technology and the necessity of actually conducting experimental work to determine the efficiency of a particular combination of fire retardants.

SUMMARY OF THE INVENTION

A combination of aluminum oxide trihydrate (ALTH, $Al_2O_3 \cdot 3H_2O$) and zinc oxide (ZnO) synergistically decreased the flammability of polyvinyl chloride (PVC) and the maximum smoke intensity generated in the combustion of the ALTH, ZnO, PVC combination. Both ALTH and ZnO individually decreased the flammability of PVC as well as the maximum smoke intensity developed by burning PVC; however, the combination of ALTH and ZnO unexpectedly functioned as a beneficial synergistic combination in reducing flammability of PVC and smoke development of burning PVC.

The exact concentrations of ALTH and ZnO may vary over a relatively wide range and the relative amounts employed will be dictated to some extent by the physical properties desired in the final combination. Thus the range of concentration (expressed in parts by weight per 100 parts by weight of PVC) of ALTH may be 6 to 150 and that of ZnO from 1 to 25. The preferred range of ALTH is from 15 to 75 parts and that of ZnO from 2.5 to 12.5 parts. The ratio of ALTH to ZnO may also vary widely over a range of about .1 to 30 but a ratio of about .1 to 6 is generally preferred. It should be obvious that at the higher concentration of ALTH and ZnO, a greater degree of fire retarding will be realized although the original physical properties of PVC may be modified to a greater extent.

THE POLYVINYL CHLORIDE POLYMERS

The PVC polymers in which the synergistic combination of ALTH and ZnO is effective may vary in molecular weight over a relatively wide range and would include the molecular weight ranges of all commercially useful PVC polymers. Based on an article on vinyl chloride polymers in the Encyclopedia of Polymer Science and Technology, Vol. 14 pages 305–483 (Interscience Publishers) the number average molecular weight range is about 50,000 to 120,000 but may be extended as new fabricating techniques are developed.

The chlorine content of PVC homopolymer is about 57 weight per cent. The homopolymer may be plasticized with a chlorine-containing plasticizer or with a plasticizer which contains no chlorine. The response of these plasticized PVC compositions to the synergistic combination of ALTH and ZnO is expected to be similar to the response of unplasticized PVC homopolymer. It should be obvious that if a PVC composition contains a high percentage of plasticizer (e.g., 90 weight per cent plasticizer) the response of this composition would not be expected to be the same as obtained with unplasticized homopolymer. However, within practical limits of plasticizer concentration, the response of plasticized PVC homopolymer to the synergistic combination of ALTH and ZnO would be expected to approach the response of unplasticized PVC homopolymer.

Vinyl chloride monomer can be copolymerized with other vinyl monomers such as vinyl acetate, vinylidene chloride etc. to form copolymers which should also respond to the synergistic combination of ALTH and ZnO. Again, practical aspects must be considered. If a copolymer of vinyl chloride and vinyl acetate contains a high percentage of vinyl acetate (e.g., 90 weight per cent) the response of the copolymer to the synergistic combination of ALTH and ZnO would be less than if the copolymer contained 10 or 5 weight per cent vinyl acetate. In order to demonstrate the maximum beneficial effect on flame retardation and smoke suppression, the experimental work was conducted with unplasticized, PVC homopolymer.

THE SYNERGISTIC MIXTURE

The synergistic mixture may be prepared by any commercial procedure for incorporating solid additives into PVC as, for example, blending of the dry solids followed by milling the mixture and subsequently molding the milled mixture at conventional temperatures and pressures for a sufficient time to obtain an acceptable molded part. The only general requirement is that the ALTH and ZnO should be well dispersed in the PVC for maximum fire retarding.

NATIONAL BUREAU OF STANDARDS SMOKE DENSITY CHAMBER

Evaluations for the density of visible smoke were made using a commercial smoke density chamber modeled after one developed at the National Bureau of Standards by the Fire Research Group (see D. Gross, J. J. Loftus and A. F. Robertson, ASTM SPECIAL TECHNICAL PUBLICATION 422, pages 166–204 (1969).) This chamber contains a radiant heater producing 2.5 W/cm$^2$ of heat at the surface of a 3 inch × 3 inch sample, a propane-air pilot burner and a vertical beam of light with a photomultiplier tube detector and microphotometer to record the attenuation of light by smoke developing in the chamber. During smoke testing, the chamber is sealed to enclose the combustion products and smoke. The smoke developed is measured as Specific Optical Density, $D_S$, where $$D_S = \frac{V}{AL} \log_{10} \frac{T_o}{T} = 132 \log_{10} \frac{T_o}{T}$$

V = volume of chamber
A = area of test specimen
L = length of light path
$T_o$ = initial light transmittance through the chamber
T = transmittance of light during test At the peak of smoke build-up $D_S = D_m$, and for purposes of the report, corrected maximum smoke is recorded as $D_{mc} = D_m - D_c$ where $D_c$ is the clear beam specific optical density occurring after the smoke test, when the chamber has been exhausted of smoke. Lower values of $D_{mc}$ indicate less obscuration of light due to smoke.

Several other quantities measured include the time in minutes to 90 per cent of $D_m$ (t.9$D_m$) and the time (in minutes) to $D_S = 16$ (t.$D_{16}$), which are indicative of the rates of smoke development (higher numbers signify slower rates).

The physical significance of the smoke data are presented below but it should be emphasized that the ranges are arbitrary and only represent generalizations based on experience. The description is based partly on the patentees own experience as well as published data (see SPE Journal Vol. 28, No. 10, pages 43–49, 1972, authored by James R. Gaskill).

$D_{mc}$ = Specific optical density at maximum smoke intensity, corrected for fogging of lense seals. $D_{mc}$ < 25, light; 25–75, moderate; 100–400, dense; > 400 very dense.

t.9$D_m$ = time (minutes) to reach 90% of maximum optical density.

t$D_{16}$ = time (minutes) to D = 16; corresponds to early visibility obscuration. t$D_{16}$ < 1, very fast; 1–3 fast; 4–6 moderate; 7–10, slow; > 10, very slow smoker.

Sample flammability was measured by the Limiting Oxygen Index (LOI) procedure (ASTM D-2863-70) in which larger numbers indicate improved retardation. The LOI is defined as the minimum concentration of oxygen in an oxygen/nitrogen mixture which will just sustain combustion of the sample. In mathematical terms the LOI is defined as $$\frac{[O_2]}{[O_2] + [N_2]} \times 100$$

Ambient air contains ca. 20.8 per cent oxygen; therefore an LOI above 20.8 is desirable.

EXPERIMENTAL RESULTS

To demonstrate the beneficial result on lowering flammability of PVC and reducing the smoke intensity of burning PVC by incorporating a combination of ALTH and ZnO in the PVC, samples of the following general composition were prepared:

|  | Parts by Weight |
|---|---|
| Polyvinyl chloride | 100 |
| Calcium Stearate | 2 |
| Thermolite 20 (dibutyltin bis(lauryl mercaptide)) | 3.75 |
| ALTH and ZnO | Variable |

The polyvinyl chloride polymer was a commercial product of the Firestone Plastics Company. The calcium stearate was a commercial grade product used primarily as an internal lubricant. Thermolite 20 was used as a thermooxidative stabilizer. The ALTH and ZnO were also commercial products. The preparation procedure was to mix the ingredients on a hot mill (177° C.) until a uniform dispersion was obtained. The samples were then molded under pressure into slabs nominally 0.030 inches thick. Test specimens approximately 3 inches square were cut from the slabs for testing.

The NBS Smoke Density Chamber and LOI test results are summarized in Table I.

TABLE I

| Sample No. | NBS Smoke Chamber Results, Flaming[a] | | | LOI |
|---|---|---|---|---|
|  | $D_{mc}$ | t.9$D_m$ | t.$D_{16}$ |  |
| A | 357 | 2.67 | 0.42 | 45.1 |
| B (ZnO, 5 parts) | 317 | 1.85 | 0.31 | 50.2 |
| C (ALTH, 30 parts) | 284 | 3.20 | 0.48 | 49.0 |
| D (ZnO, 5 parts; ALTH, 30 parts) | 187 | 2.56 | 0.45 | 70.9 |

[a]Average of two runs; average $D_{mc}$ values accurate within ± 5–8 per cent

With reference to Table I, Sample A was the reference sample which contained 100 parts by weight of PVC, 2 parts by weight calcium stearate and 3.75 parts by weight Thermolite 20. Samples B, C and D were of the same composition as Sample A except ALTH and ZnO were added in concentrations which are indicated in Table I. It should be noted that the effect of calcium stearate and Thermolite 20 on the flammability and smoking tendency of PVC is not defined by the data in Table I; however, the effect should be consistent in all of the samples. It would be difficult to show the effect of calcium stearate and Thermolite 20 since these materials were required to obtain a good sample by molding without partial decomposition of the PVC polymer.

As shown by the data in Table I, the reference Sample A has a $D_{mc}$ smoke intensity value of 357 which was reduced to a value of 317 (a 40 unit decrease or about an 11.2 per cent reduction) by incorporation of 5 parts ZnO. Sample C which contained 30 parts of ALTH had a $D_{mc}$ value of 284 (a 73 unit decrease or about a 20.4 per cent reduction) as compared to Sample A. Sample D, which contained 5 parts of ZnO and 30 parts of ALTH had a $D_{mc}$ value of 187 which is 170 units (ca. 47.6 per cent reduction) lower than the control Sample A.

If the effects of ZnO and ALTH were additive, the $D_{mc}$ value of Sample D should be 244. That is, the $D_{mc}$ value of Sample A (357) would be reduced by 40 units (the effect of ZnO and 73 units (the effect of ALTH) to an expected value of 244. In contrast, the experimental value for Sample D is 187 units or an unexpected decrease of 57 $D_{mc}$ units (244-187 = 57). This unexpected decrease in $D_{mc}$ value is considered significant in that it is greater than the effect of 5 parts of ZnO and approaches the effect of 30 parts of ALTH.

An unexpected beneficial synergistic effect of ZnO and ALTH on the LOI value of PVC is also shown by the data in Table I. It should be noted that 5 parts of ZnO increased the LOI value of Sample A 5.1 units (an 11.3 per cent increase) and that 30 parts of ALTH increased the LOI value 3.9 units (an 8.6 cent increase); as shown by comparing the LOI values of Samples B and C with that of Sample A. Therefore the predicted or additive effect of 5 parts of ZnO and 30 parts of ALTH on the LOI value of Sample A would be 45.1 plus 5.1 plus 3.9 to a total of 54.1. In contrast, the observed LOI value on Sample D is 70.9 or an unexpected increase in LOI of 16.8 units (70.9-54.1 = 16.8).

For brevity, the following abbreviations are used:

$D_{mc}$ = maximum smoke intensity
$t.D_{16}$ = initial rate of smoke generation
$t.9D_m$ = overall rate of smoke generation As far as rate of smoke generation as measured by $t.9D_m$ and $t.D_{16}$ values is concerned, the data in Table I show that 5 parts of ZnO actually increased the rate of smoke generation of Sample A and 30 parts of ALTH decreased the early rate of smoke generation of Sample A. The combined effects of ZnO and ALTH on the rate of smoke generation can be determined by comparing the $t.9D_m$ and $t.D_{16}$ values of Sample A with those of Sample D. It will be noted that the ZnO/ALTH combination very slightly decreases the initial rate of smoke generation (0.45—0.42=.03 minutes) but substantially decreased the overall rate of smoke generation, as indicated by the ratio: $D_{mc}/t.9D_m$.

That is, Sample A had a $D_{mc}$ value of 357 and a $t.9D_m$ value of 2.67; therefore, the overall rate of smoke generation would be about 133 units per minute (357/2.67 = 133). In contrast, Sample D had a $D_{mc}$ value of 187 and a 2.56 minute $t.9D_m$ value or an overall rate of smoke generation of 73 units per minute. The latter results demonstrates the slower rate of total smoke generation with the sample containing ALTH and ZnO.

In summary, the data summarized in Table I demonstrate an unexpected beneficial effect derived from a combination of ZnO and ALTH on maximum smoke intensity ($D_{mc}$) and LOI (a measure of flammability) of PVC. The combination of ZnO/ALTH also has a beneficial effect on reducing the initial rate of smoke generation ($t.D_{16}$) and the overall rate of smoke generation ($t.9D_m$) of PVC.

We claim:

1. Polyvinyl chloride which contains 6 to 150 parts by weight of aluminum oxide trihydrate and 1 to 25 parts by weight of zinc oxide, with the ratio of zinc oxide to aluminum oxide trihydrate of substantially 1 to 30, per 100 parts by weight of the vinyl chloride.

2. The composition of claim 1 which contains substantially 30 parts of aluminum oxide trihydrate and 5 parts of zinc oxide.

3. A fabricated product which includes the polyvinyl composition of claim 1.

* * * * *

Notice of Adverse Decision in Interference

Interference No. 99,770, involving Patent No. 3,957,723, D. F. Lawson and E. L. Kay, FLAME AND SMOKE RETARDANTS FOR POLYVINYL CHLORIDE, final judgment adverse to the patentees was rendered Apr. 19, 1982, as to claim 1.

[*Official Gazette October 19, 1982.*]